L. V. HOMAN.
CONDUIT FOR POWER TRANSMITTING CABLES.
APPLICATION FILED JUNE 1, 1920.
1,425,090.  Patented Aug. 8, 1922.
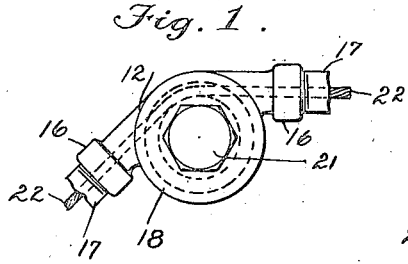
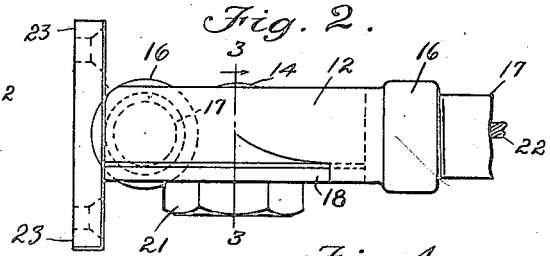
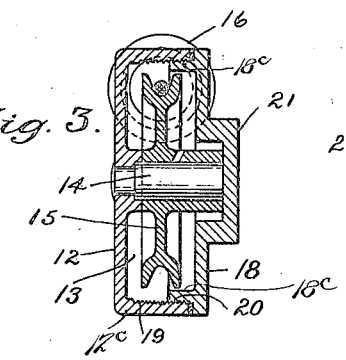
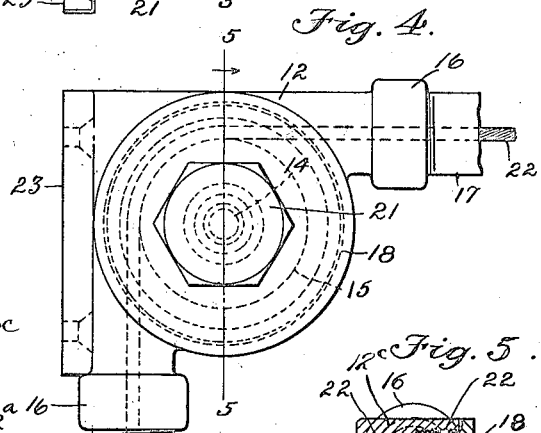
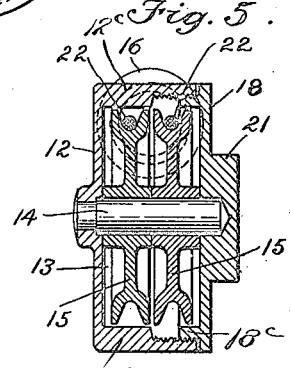
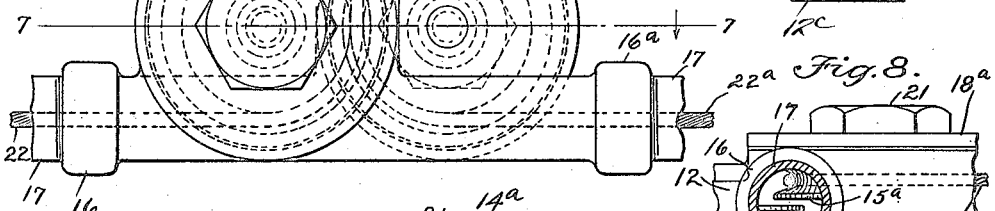
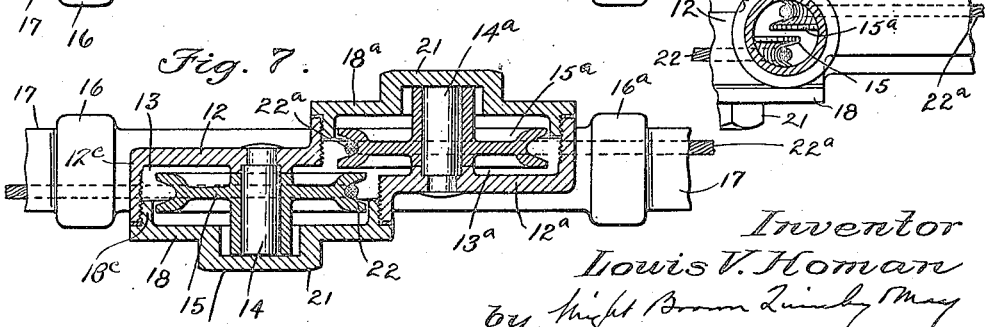
Inventor
Louis V. Homan
by Wright Brown Quinby May
Attorneys

UNITED STATES PATENT OFFICE.

LOUIS V. HOMAN, OF SOUTH DARTMOUTH, MASSACHUSETTS.

CONDUIT FOR POWER-TRANSMITTING CABLES.

1,425,090.

Specification of Letters Patent. Patented Aug. 8, 1922.

Application filed June 1, 1920. Serial No. 385,410.

*To all whom it may concern:*

Be it known that I, LOUIS V. HOMAN, a citizen of the United States, residing at South Dartmouth, in the county of Bristol and State of Massachusetts, have invented new and useful Improvements in Conduits for Power-Transmitting Cables, of which the following is a specification.

This invention relates to power-transmitting means including a flexible cable attached at one end to power-driven means, whereby it may be moved longitudinally, the cable extending from said power-driven means in an angular path, so that portions of the cable move in different directions.

The invention is embodied in the improvements which I will now proceed to describe and claim.

Of the accompanying drawings forming a part of this specification,—

Figure 1 is a side elevation of a portion of a conduit embodying the invention, and portions of a cable guided by said conduit.

Figure 2 is an edge view of a portion of the conduit, having a somewhat different arrangement from that shown by Figure 1.

Figure 3 is a section on line 3—3 of Figure 2.

Figure 4 is a side view of a portion of a conduit, which may be equipped with a pair of pulleys.

Figure 5 is a section on line 5—5 of Figure 4.

Figure 6 is a side view, showing a different arrangement embodying the invention.

Figure 7 is a section on line 7—7 of Figure 6, and a plan view of the parts below said line.

Figure 8 is a top plan view of a portion of the conduit shown by Figure 6.

The same reference characters indicate the same parts in all of the figures.

My improved conduit as shown by Figures 1 to 5, inclusive, includes an angular conduit member comprising a hollow or cupped body forming a pulley chamber 13, and composed of a central portion 12, forming one side of the chamber 13, and an annular wall portion or flange 12$^c$ forming the margin and open end of the chamber. The wall portion 12$^c$ is provided with tubular conduit nipples 16, tangential to the chamber 13, and angularly arranged relatively to each other. Said nipples communicate with the chamber and are adapted to be coupled to conduit tubes 17, preferably by being internally threaded to engage threads on the tubes 17. The wall portion 12$^c$ is also provided with an internal screw-thread 19. The open end of the pulley chamber is closed at the side opposite the central body portion 12, by a detachable cap 18, including an annular portion 18$^c$, having a screw-thread 20, adapted to engage the thread 19 of the body. The cap is provided with a hexagonal boss 21, adapted to be engaged by a wrench.

To the central portion 12 is rigidly secured a stud 14, forming a fixed bearing on which a pulley 15 is removably journaled, the pulley being arranged to guide a cable 22 from one nipple 16 to the other.

Owing to the fact that the stud 14 is rigidly attached to the hollow body, and supports the pulley independently of the cap 18, the cap may be removed without depriving the stud of any part of its support, so that the stud remains in place, and does not have to be handled or touched by the operator when the conduit member is opened. The pulley may be lubricated without removing it from the stud, or it may be conveniently withdrawn from the stud, lubricated, and replaced on the stud.

The screw-thread connection between the cap and the body enables the cap to be quickly and conveniently removed and replaced, by rotation of the cap, and forms a continuous water-tight joint between the body and the cap.

The angularity of the nipples 16 relatively to each other, may be varied. Said nipples may be arranged so that their longitudinal axes are at an obtuse angle relatively to each other, as shown by Figure 1, or at any other desired angle. The cap 18 confines the pulley in place in the chamber 13. When said cap is removed, access is permitted to the pulley for the purpose of lubricating or removing the same, the stud 14 remaining in place when the pulley is removed.

When the axes of the nipples 16 are substantially at right angles with each other as shown by Figures 2 and 4, the body 12 may be provided with ears 23, adapted to receive attaching screws securing the said ears to fixed supports.

As indicated by Figures 4 and 5, the chamber 13 and stud 14 may be formed to accommodate two pulleys 15 located side by side and guiding the two cables 22, the nipples 16 being formed to accommodate the two cables, as indicated by Figure 5.

Figures 6, 7, and 8 show a somewhat different embodiment of the invention, in which the body is composed of two portions 12 and 12ª, offset from each other, the portion 12ª forming an additional open-sided pulley chamber 13ª, and provided with an additional stud 14ª, an additional pulley 15ª, a detachable cap 18ª, and an additional nipple 16ª. The arrangement is such that the pulleys are adapted to guide two flexible cables 22 and 22ª from one nipple 16 in opposite directions, one cable passing through the other nipple 16, and the other cable passing through the additional nipple 16ª.

It is obvious that the complete conduit may include any desired number of body portions 12 having end portions 16, these being connected by tubular portions 17 to form a conduit having any desired arrangement.

I claim:

An angular conduit member comprising a hollow body including two body portions forming two pulley chambers, and including screw-threaded annular walls forming openings at opposite sides of the body, and each provided with tangentially arranged tubular conduit nipples, the nipples on each wall being angularly arranged relatively to each other, and adapted to be coupled to conduit tubes; pulley-bearing studs fixed to the said body portions and projecting through the centers of said chambers, pulleys removably journaled on said studs, and adapted to guide flexible cables passing through said nipples; and caps formed to close said openings and confine the pulleys on the studs, said caps being provided with screw threads engaging the screw threads of the said annular walls, so that the caps are detachable to permit access to the pulleys, and the removal of the latter from the studs, the said body portions being offset from each other to locate the said pulley chambers and pulleys in different parallel planes.

In testimony whereof I have affixed my signature.

LOUIS V. HOMAN.